(12) United States Patent
Johnson

(10) Patent No.: US 8,291,187 B2
(45) Date of Patent: *Oct. 16, 2012

(54) MEMORY MANAGEMENT USING GARBAGE COLLECTION OF SCOPED MEMORY

(75) Inventor: Andrew Johnson, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 816 days.

This patent is subject to a terminal disclaimer.

(21) Appl. No.: 12/235,636

(22) Filed: Sep. 23, 2008

(65) Prior Publication Data

US 2009/0083509 A1    Mar. 26, 2009

(30) Foreign Application Priority Data

Sep. 25, 2007    (GB) .................................. 07117129.2

(51) Int. Cl.
*G06F 12/00* (2006.01)

(52) U.S. Cl. ......... 711/170; 711/E12.001; 711/E12.002; 711/E12.009; 707/813; 707/816

(58) Field of Classification Search .................. 711/170, 711/E12.001, E12.002, E12.009; 707/813, 707/816, 81

See application file for complete search history.

(56) References Cited

U.S. PATENT DOCUMENTS

| | | | |
|---|---|---|---|
| 5,687,368 A | 11/1997 | Nilsen | |
| 5,873,105 A | 2/1999 | Tremblay et al. | |
| 6,654,948 B1 | 11/2003 | Konuru et al. | |
| 6,845,385 B1 | 1/2005 | Hennessey | |
| 6,865,657 B1 | 3/2005 | Traversat et al. | |
| 6,874,074 B1* | 3/2005 | Burton et al. | 711/170 |
| 7,089,173 B1 | 8/2006 | Molson et al. | |
| 7,092,978 B2 | 8/2006 | Garthwaite | |
| 7,469,324 B2 | 12/2008 | Tene et al. | |
| 7,484,067 B1* | 1/2009 | Bollella et al. | 711/170 |
| 7,496,897 B1 | 2/2009 | Dibble et al. | |
| 7,779,054 B1 | 8/2010 | Printezis et al. | |
| 7,822,790 B2* | 10/2010 | Abuaiadh et al. | 707/813 |
| 8,122,068 B2 | 2/2012 | Johnson | |

(Continued)

FOREIGN PATENT DOCUMENTS

EP    1717706 A1    11/2006

OTHER PUBLICATIONS

Bollella et al., "The Real-Time Specification for Java", Addison-Wesley, Library of Congress Control No. 00-132774, ISBN 0-2-1-70323-8, first printing, Jun. 2000, pp. 57-83.

(Continued)

*Primary Examiner* — Midys Rojas
(74) *Attorney, Agent, or Firm* — Stephen J. Walder, Jr.; David A. Mims, Jr.

(57) ABSTRACT

Mechanisms for memory management in a scoped memory system are provided. The scoped memory system includes a scoped memory area for the allocation of objects therein for access by one or more software threads in execution. The scoped memory area has an associated thread count for indicating that the scoped memory area is discardable. The mechanisms identify a set of root references for objects allocated in the scoped memory area and recursively traverses and marks objects that are referenced from the set of root references and that are allocated in the scoped memory area. The mechanisms further identify objects in the scoped memory area that are not so marked and discards the identified objects.

21 Claims, 5 Drawing Sheets

U.S. PATENT DOCUMENTS

| | | |
|---|---|---|
| 8,140,598 B2 | 3/2012 | Johnson |
| 2002/0078002 A1 | 6/2002 | Bottomley et al. |
| 2003/0097537 A1 | 5/2003 | Bollella et al. |
| 2007/0156367 A1 | 7/2007 | Kucukcakar et al. |
| 2007/0288538 A1 | 12/2007 | Bacon et al. |
| 2009/0037684 A1 | 2/2009 | Obata et al. |
| 2009/0083348 A1 | 3/2009 | Johnson |
| 2009/0083349 A1 | 3/2009 | Johnson |

OTHER PUBLICATIONS

Andrew J. Wellings, "Concurrent and Real-Time Programming in Java", ISBN 0-470-84437-X, Chapter 7 and Chapter 8, 2004, 63 pages.

Corsaro et al., "Efficient Memory-Reference Checks for Real-time Java", ACM, SIGPLAN, vol. 38, Issue 7, Jul. 2003, 8 pages.

Abdullahi et al., "Garbage Collecting the Internet: A Survey of Distributed Garbage Collection", ACM Computing Surveys, vol. 30, No. 3, Sep. 1998, pp. 330-373.

Monnet et al., "Hybrid Checkpointing for Parallel Applications in Cluster Federations", IEEE International Symposium on Cluster Computing and the Grid, 2004, pp. 773-782.

Veldema et al., "Distributed Shared Memory Management for Java", http://citeseer.ist.psu.edu/veldema99d, 1999, pp. 1-10.

Veldema et al., "Jackal, A Compiler Based Implementation of Java for Clusters of Workstations", http://citeseer.ist.psu.edu/308851.htm, 2001, pp. 1-8.

U.S. Appl. No. 12/235,638, filed Sep. 23, 2008, Andrew Johnson.

U.S. Appl. No. 12/235,640, filed Sep. 23, 2008, Andrew Johnson.

U.S. Appl. No. 12/235,638, 2 pages.

U.S. Appl. No. 12/235,640, 2 pages.

Basanta-Val, Pablo et al., "Towards the Integration of Scoped Memory in Distributed Real-Time Java", IEEE, Proceedings of the Eighth International Symposium on Object-Oriented Real Time Distributed Computing, Jun. 6, 2005, 8 pages.

Beebee, Jr., William S. et al., "An implementation of Scoped Memory for Real-Time Java", MIT Laboratory for Computer Science, 2001, 18 pages.

Bollella, Greg et al., "Scoped Memory", IEEE, Proceedings of the Fifth IEEE International Symposium on Object-Oriented Real-Time Distributed Computing, 2002, 3 pages.

Higuera-Toledano, M. Teresa et al., "Improving the Scoped Memory Region Garbage Collector of Real-Time Java", Facultad Informatica, Universidad Complutense de Madrid, Ciudad Universitaria, Jun. 23, 2006, 8 pages.

Interview Summary mailed Nov. 7, 2011 for U.S. Appl. No. 12/235,640, 3 pages.

Notice of Allowance mailed Oct. 14, 2011 for U.S. Appl. No. 12/235,638, 8 pages.

Response to Office Action filed with the USPTO on Nov. 3, 2011 for U.S. Appl. No. 12/235,640, 16 pages.

International Search Report and Written Opinion dated Nov. 18, 2008 for International Application No. PCT/EP2008/061713, 10 pages.

Interview Summary mailed Sep. 2, 2011 for U.S. Appl. No. 12/235,638, 3 pages.

Response to Office Action filed with the USPTO on Aug. 29, 2011 for U.S. Appl. No. 12/235,638, 10 pages.

Gosling, James et al., "The Real-Time Specification for Java", Jun. 2000, IEEE, 8 pages.

Final Office Action mailed Mar. 13, 2012 for U.S. Appl. No. 12/235,640, 30 pages.

Interview Summary mailed Apr. 12, 2012 for U.S. Appl. No. 12/235,640, 3 pages.

Notice of Allowance mailed Apr. 30, 2012 for U.S. Appl. No. 12/235,640; 10 pages.

Response to Final Office Action filed with the USPTO on Apr. 13, 2012 for U.S. Appl. No. 12/235,640; 10 pages.

\* cited by examiner

MEMORY MANAGEMENT USING GARBAGE COLLECTION OF SCOPED MEMORY

TECHNICAL FIELD

The present invention relates to memory management in a computer system. More particularly it relates to garbage collection of scoped memory.

BACKGROUND

Memory management in runtime environments is often devised so as to provide convenience for the software engineer. For this reason, runtime environments such as Java (Java is a Registered Trademark of Sun Microsystems Inc.) include heap memory having a garbage collector. A garbage collector is a runtime facility for automatically identifying and discarding unused data from memory, such as objects, so as to free up storage.

Garbage collection is a luxury afforded by the efficiencies of modern computer systems that serves to liberate software engineers from the task of programmatically discarding each and every unused object. It does, however, present some drawbacks. One such drawback is that the process of garbage collection generally requires the suspension of execution of software threads accessing the heap. This is because the process of identifying and discarding unused objects cannot normally be undertaken while software threads actively allocate and access existing or new objects. For the garbage collector to operate effectively, the state of the heap is to be preferably static and determinate for the duration of the garbage collection process. The duration of suspension of threads for garbage collection depends on the number and variety of data objects existing in the heap and can range from an imperceptibly short duration to periods long enough to be perceived by a user. Thus the process of garbage collection can lead to delays of indeterminate frequency and duration. These downsides render garbage collected runtime environments inherently unsuitable for software depending on continuity of execution and predictability. Such software includes critical real time applications such as those used in monitoring and control applications, and these applications are normally precluded from accessing a garbage collected memory in order to ensure their consistency and stability.

To address these downsides of garbage collected heap memory, runtime environments can be adapted to use scoped memory areas. Scoped memory areas are areas of memory suitable for the allocation and de-allocation of objects without some of the disadvantages of garbage collected heaps. A software thread can enter a scoped memory area and all object allocations by the thread will then be made within the scoped memory area. The thread can also enter multiple scoped memory areas in a nested fashion. For example, the thread can enter a second scoped memory area which becomes the default allocation area. Scoped memory areas are organised in a scope graph with each scoped memory area having a parent being the previously entered scoped memory area. A first scoped memory area has a primordial scoped memory area as its parent.

A thread count is maintained for each scoped memory area of a number of active threads in the area. The thread count coupled with the scope graph indicates when a scoped memory area, including any objects allocated in the scoped memory area, is discardable. For example a scoped memory area may be discardable when an associated thread count is decremented from one to zero and the scoped memory area is not a parent for any other scoped memory area. In this way, scoped memory areas offer alternative allocation spaces for objects in an otherwise garbage collected runtime environment, such as Java. The use of such scoped memory areas can address the problem of delays and uncertainty in application execution caused by garbage collection algorithms since all objects in scoped memory areas become discardable at the same time defined in terms of thread usage of the memory area and the organisation of a scope graph.

A first object in a first scoped memory area can reference a second object in a second scoped memory area. However, since individual scoped memory areas can become completely discardable it is necessary to enforce strict rules regarding valid and invalid references between objects in different scoped memory areas. These rules are necessary to guarantee that a parent scoped memory area has a lifetime that is at least that of its child scoped memory areas so that objects in descendant memory areas can reliably reference objects in ancestor memory areas. In this way, dangling references can be avoided. This is described in "Efficient Memory-Reference Checks for Real-time Java" (Corsaro and Cytron, ACM SIGPLAN Volume 38, Issue 7 July 2003).

One such rule is that a scoped memory area has at most one parent. This is known as the "single parent rule". The single parent rule provides that the order of entry into scoped memory areas by different threads is always the same because the order of entry of threads into scoped memory areas defines the structure of the scoped memory areas in the scope graph. Further, a source object allocated in a source scoped memory area can only reference target objects in the same or ancestral scoped memory areas. An ancestral scoped memory area is a memory area which is entered by a thread before the source scoped memory area. The source scoped memory area is said to have inner scope with respect to that of the target object. This criterion ensures that the source object will always be de-allocated before the target object. Attempts to create references which do not satisfy the criterion must fail according to the Real-Time Specification for Java (Bollella et al, Addison-Wesley, 2000). Thus the criterion must be checked in an efficient manner whenever a new reference to a target object is created.

One way to determine whether this criterion is satisfied for the creation of a reference between objects is to iterate through scoped memory areas in a scope graph. Iteration starts at the source scoped memory area and progresses through each parent scoped memory area checking for the target scoped memory area. If the target scoped memory area is encountered within the scope graph during the iterations then it can be concluded that the criterion is satisfied because the target area is an ancestor of the source area. If the iterations reach the primordial scoped memory area (the "root" of the scope graph) then it can be concluded that the criterion is not satisfied because the target scoped memory area is not an ancestor of the source scoped memory area.

An alternative approach is to determine an index of the distance between the scoped memory area of the target object and the primordial scoped memory area. This distance can be considered to be a "depth" of the target scoped memory area. Additionally, an index of the distance between the scoped memory area of the source object and the primordial scoped memory area can be determined as a "depth" of the source scope. The term depth here is used to indicate that scoped memory areas exist at levels which are some distance from the primordial scoped memory area. Deeper scoped memory areas are located at a level in the scope graph which is further from the primordial scoped memory area. A comparison of these indices of depth will determine whether the target scoped memory area is an ancestor of the source scoped memory area because descendent areas will always be deeper (further from the primordial scoped memory area) than ancestor areas. Thus, if the source scoped memory area is deeper than the target scoped memory area then the criterion is satisfied and a reference can be created.

FIG. 1 is a block diagram of an exemplary scoped memory system 100 in the prior art. The scoped memory system is an arrangement of a part of a storage of a computer system such as the scoped memory system described in the Real-Time Specification for Java (Bollella et al, Addison-Wesley, 2000). In use, the scoped memory system 100 includes a scope graph 102 which is a data structure arrangement of zero or more scoped memory areas such as scoped memory area 106. Scope graph 102 is commonly referred to in the art as a "scope stack" although the data structure of scope graph 102 is not necessarily a stack data structure. The scope graph 102 can be implemented as a directed graph data structure, a stack data structure, a tree data structure, a linked list or any data structure suitable for the storage of zero or more scoped memory areas.

Scoped memory area 106 is a defined area of memory in storage suitable for the allocation and reference of software objects. Objects can be allocated and accessed in an allocated objects 112 part of the scoped memory area by software threads which execute in the context of the scoped memory area 106. The scoped memory area 106 further includes a thread count 110 as a count of a number of software threads executing in the context of the scoped memory area 106. A thread executes in the context of the scoped memory area 106 by explicitly entering the scoped memory area, such as by calling of an application programming interface function. Once a thread has entered the scoped memory area 106, allocations of objects will be undertaken within the scoped memory area 106 unless specifically allocated elsewhere by the thread, such as in the general heap or another scoped memory area.

Scoped memory area 106 further includes a parent field 108 which includes a reference to a parent scoped memory area. As described above, a scoped memory area has at most one parent. An arrangement of scoped memory areas defined by way of a parental relationships there-between defines the scope graph 102. An initial scoped memory area having no particular parent will refer to a primordial scoped memory area 104 as its parent by way of a placeholder.

Critical software depending on continuity of execution and predictability can use scoped memory areas for the allocation of objects. Since scoped memory areas are not garbage collected, delays and uncertainty associated with garbage collection processes do not affect scoped memory or software threads using scoped memory. While this provides certainty for critical software threads, it presents the disadvantage that individual objects allocated in scoped memory are not discarded until all objects in the scoped memory are discardable. Thus scoped memory can become consumed by numerous unused objects.

It would therefore be advantageous to provide the advantages of garbage collection with the certainty and consistency of scoped memory.

BRIEF SUMMARY

In one illustrative embodiment, a method, implemented in a data processing system, of memory management in a scoped memory system of the data processing system is provided. The scoped memory system includes a scoped memory area for the allocation of objects therein for access by one or more software threads in execution. The method comprises identifying, by a scoped memory garbage collector of the data processing system, a set of root references for objects allocated in the scoped memory area of the scoped memory system. The method also comprises recursively traversing and marking, by the scoped memory garbage collector, objects that are referenced from the set of root references and that are allocated in the scoped memory area of the scoped memory system. The method further comprises identifying objects in the scoped memory area that are not so marked, and discarding said identified objects.

In another illustrative embodiment, an apparatus for memory management in a scoped memory system is provided. The scoped memory system includes a scoped memory area for the allocation of objects therein for access by one or more software threads in execution. The apparatus comprises a processor and a memory coupled to the processor. The memory comprises a computer program which configures the processor to identify a set of root references for objects allocated in the scoped memory area, traverse and mark objects that are referenced from the set of root references and that are allocated in the scoped memory area, identify objects in the scoped memory area that are not so marked, and discard the identified objects.

In yet another illustrative embodiment, a computer program product in a computer readable medium is provided. The computer program code, when loaded into a computer system and executed thereon, causes the computer system to identify a set of root references for objects allocated in a scoped memory area of a scoped memory system of the computer system, traverse and mark objects that are referenced from the set of root references and that are allocated in the scoped memory area, identify objects in the scoped memory area that are not so marked, and discard the identified objects.

In still a further illustrative embodiment, a computer system is provided that comprises a processor and a scoped memory system coupled to the processor, the scoped memory system including a scoped memory area for the allocation of objects therein for access by one or more software threads in execution on the processor. The computer system further comprises a scoped memory garbage collector coupled to the scoped memory system. The scoped memory garbage collector is implemented in hardware within the computer system. The scoped memory garbage collector operates to identify a set of root references for objects allocated in the scoped memory area, traverse and mark objects that are referenced from the set of root references and that are allocated in the scoped memory area identify objects in the scoped memory area that are not so marked, and discard the identified objects.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

A garbage collected heap in a runtime environment can be employed by all software threads in execution. The process of garbage collection of the heap can therefore require the suspension of all executing threads using the heap. This imposes an uncertain delay on all such threads. In contrast, the application of a garbage collection process to a scoped memory area can only affect the threads accessing the scoped memory area. For this reason, the extent of any such uncertain delay is constrained only to those threads accessing the scoped memory area. Further, since the number of such threads accessing the scoped memory area is typically small (in comparison with all threads in an application), the length of any such delay is also constrained. Thus, a garbage collection process applied to a scoped memory area will provide the advantages of garbage collection with the certainty of scoped memory by virtue of the limited number of threads accessing the scoped memory. The illustrative embodiments provide mechanisms for performing such a garbage collection process on scoped memory areas.

Figure 1:
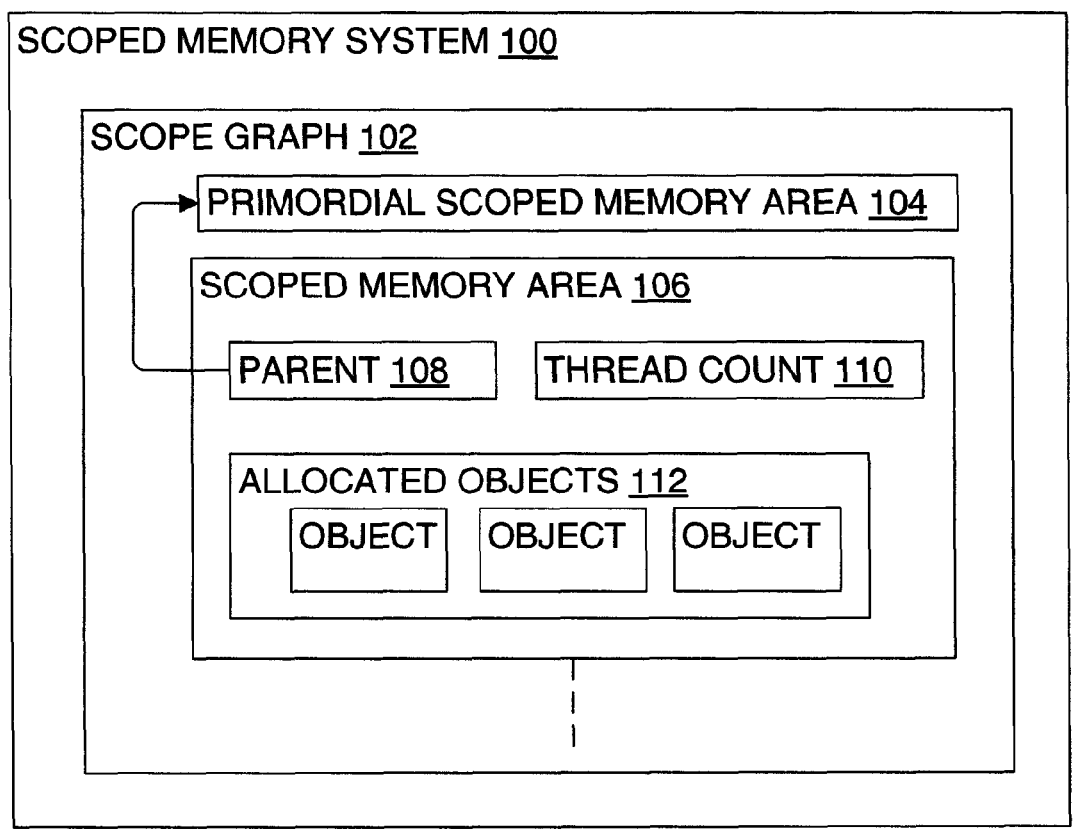
FIG. 1 is a block diagram of an exemplary scoped memory system in the prior art.
Figure 2:
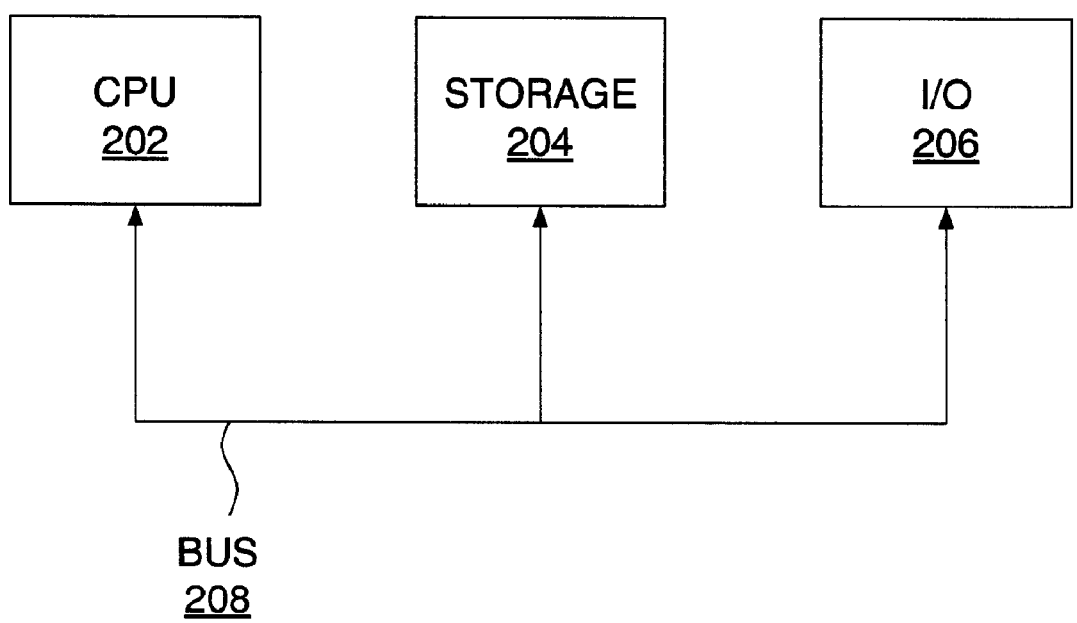
FIG. 2 is an example block diagram of a computer system suitable for the operation of illustrative embodiments of the present invention.

FIG. 2 is a block diagram of a computer system suitable for the operation of embodiments of the present invention. A central processor unit (CPU) 202 is communicatively connected to a storage 204 and an input/output (I/O) interface 206 via a data bus 208. The storage 204 can be any read/write storage device such as a random access memory (RAM) or a non-volatile storage device. An example of a non-volatile storage device includes a disk or tape storage device. The I/O interface 206 is an interface to devices for the input or output of data, or for both input and output of data. Examples of I/O devices connectable to I/O interface 206 include a keyboard, a mouse, a display (such as a monitor) and a network connection.

Figure 3:
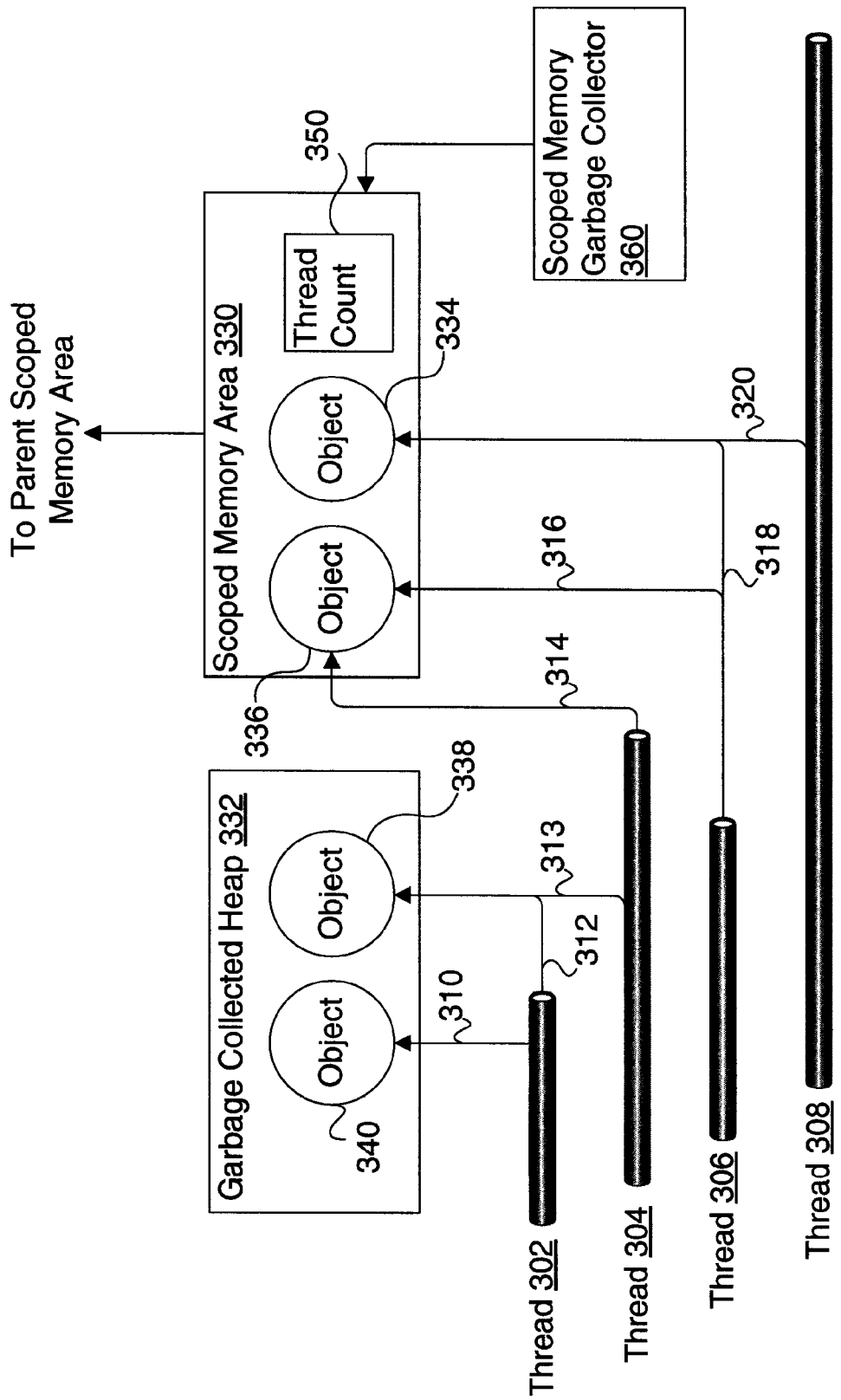
FIG. 3 is an example block diagram of a software application in execution in a software runtime environment in accordance with one illustrative embodiment of the present invention.

FIG. 3 is an example block diagram of a software application in execution in a software runtime environment in accordance with one illustrative embodiment of the present invention. The software application includes threads of execution 302 to 308. Each thread is a separate stream of software execution and includes software instructions and thread data normally stored in an area of storage known as a memory stack. Threads 302 to 308 include references 310 to 320 into allocated heap memory including a garbage collected heap 332 and a scoped memory area 330. The garbage collected heap 332 is a memory allocation space for threads in execution in the runtime environment. Software objects 340, 338 are allocated in the garbage collected heap 332. Periodically a garbage collector is operable to process the garbage collected heap 332 to discard unused objects as is well known in the art. The scoped memory area 330 is also a memory allocation space for threads in execution, and software objects 334, 336 are allocated in the scoped memory area 330. Scoped memory area 330 includes a thread count 350 of a number of threads configured to access the scoped memory area 330. The thread count is useful to determine when the scoped memory area 330 is discardable, such as when the thread count 350 indicates that no threads access the scoped memory area 330. Scoped memory area further includes a reference to a parent scoped memory area, such as a primordial scoped memory area, as is well known in the art.

References 310 to 320 are object references within threads 302 to 308. For example, each such reference can include a memory address, base and offset, or pointer to a software object. Thread 302 includes a reference 310 to object 340 in the garbage collected heap 332. Thread 302 further includes a reference 312 to object 338 in the garbage collected heap 332. Thread 304 includes a reference 313 to object 338 in the garbage collected heap and a reference 314 to object 336 in the scoped memory area 330. Thread 306 includes references 316 and 318 to objects 336 and 334 respectively in the scoped memory area. Thread 308 includes a reference 320 to object 334 in the scoped memory area. Thus, thread 302 includes only references to objects in the garbage collected heap. Threads 306 and 308 include only references to objects in the scoped memory area 330. Thread 304 includes reference to objects in both the garbage collected heap 332 and the scoped memory area 330. In execution threads 302 and 304 with references to objects allocated in the garbage collected heap 332 will be affected by the periodic processing of the garbage collector in that heap 332. On the other hand, threads 306 and 308 are not affected by the garbage collector in the garbage collected heap 332 since they have no references to objects in that heap 332. In contrast, threads 306 and 308 employ scoped memory area 330 that is discardable in dependence on the thread count 350.

In accordance with one illustrative embodiment of the present invention, the techniques of garbage collection are further applied to the scoped memory area 330 by way of a scoped memory garbage collector 360. The scoped memory garbage collector 360 is a software or hardware component of the runtime environment operable to identify and discard unused objects in the scoped memory area 330. In this way, the advantages of garbage collection are provided for the scoped memory area 330, and threads that are restricted to using only scoped memory, such as critical real time threads, are able to benefit from garbage collection.

Figure 4:
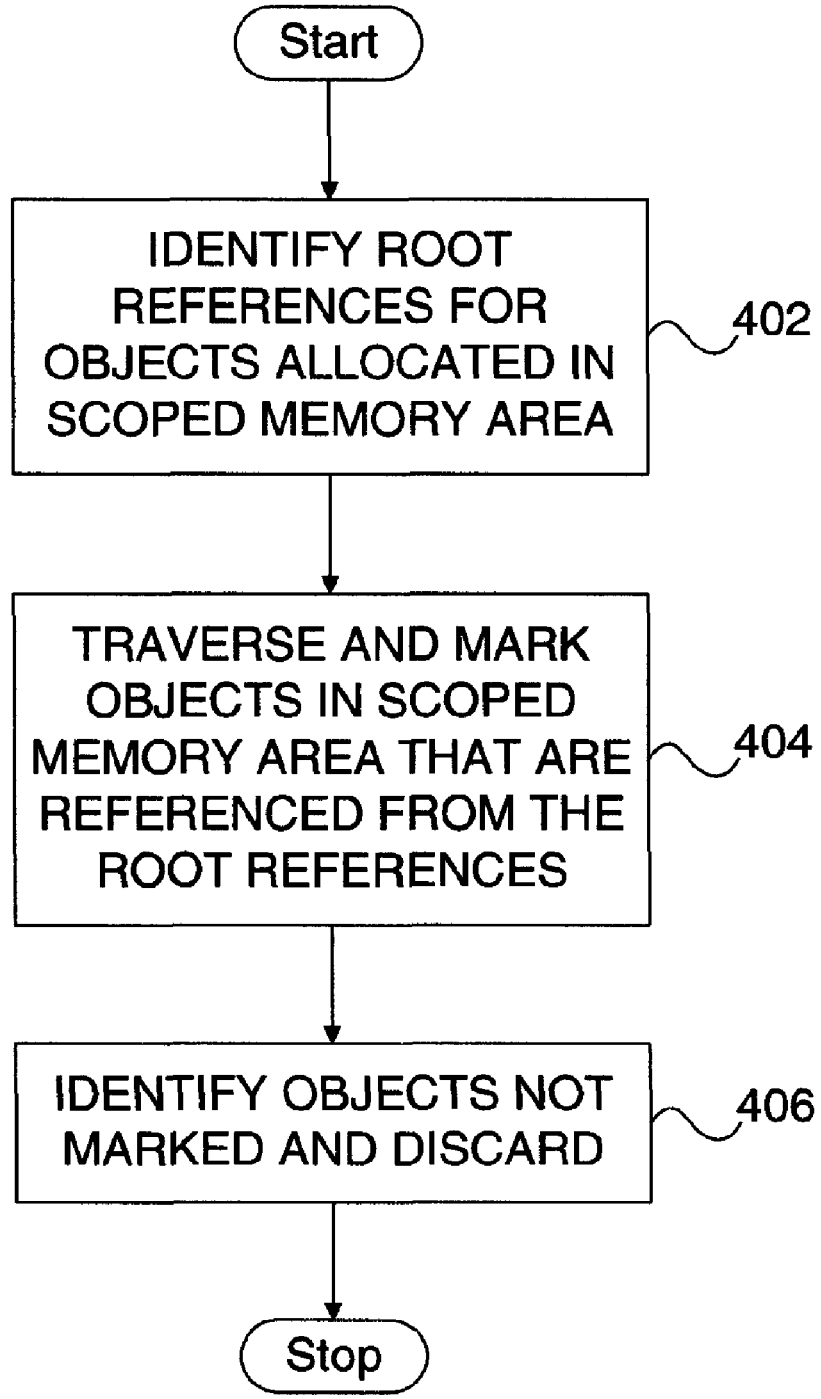
FIG. 4 is an example flowchart of a method of the scoped memory garbage collector in accordance with one illustrative embodiment of the present invention.

FIG. 4 is an example flowchart of a method of the scoped memory garbage collector 360 of FIG. 3 in accordance with one illustrative embodiment of the present invention. At step 402 the method identifies a set of root references for objects allocated in the scoped memory area 330. Root references are references leading directly or indirectly to objects allocated in the scoped memory area 330. Such references are normally at the root of a chain of references, such as stored in processor registers, on a software program stack (including local variables and temporaries), and global variables. The identification of a set of root references is inherent in methods of garbage collection and is well known in the art. For example, such an identification will include identifying all software threads having direct or indirect references to objects allocated in the scoped memory area 330. Thus, an appropriate set of root references for a scoped memory area 330 may include all references in threads having entered the scoped memory area 330.

At step 404, each reference in the set of root references is traversed recursively to identify objects that are allocated in the scoped memory area 330. Recursive traversal of a reference involves accessing all references stored at a referenced location in a recursive fashion as is undertaken, for example, when fully traversing a linked list or tree data structure. The purpose of the traversal is to identify all objects allocated in the scoped memory area 330 that are referenced from a root reference. When such an object is identified, it is marked. Marking of objects can be undertaken by any suitable fashion, such as by setting a flag within the object itself or by generating or amending an entry corresponding to the object in a separate data structure, such as a table. In this way, all objects in the scoped memory area 330 referenced by the software application in execution (such as via the threads 302 to 308) are marked.

At step 406 the method identifies objects in the scoped memory area 330 that are not marked. The objects identified at step 406 are unused objects—that is, objects to which there exists no identified reference in the software application. The objects identified at step 406 are discarded. Discarding an object can include, inter alia, marking the object as discardable, marking the memory consumed by an object as free memory, or actively deleting the object from memory.

Figure 5:
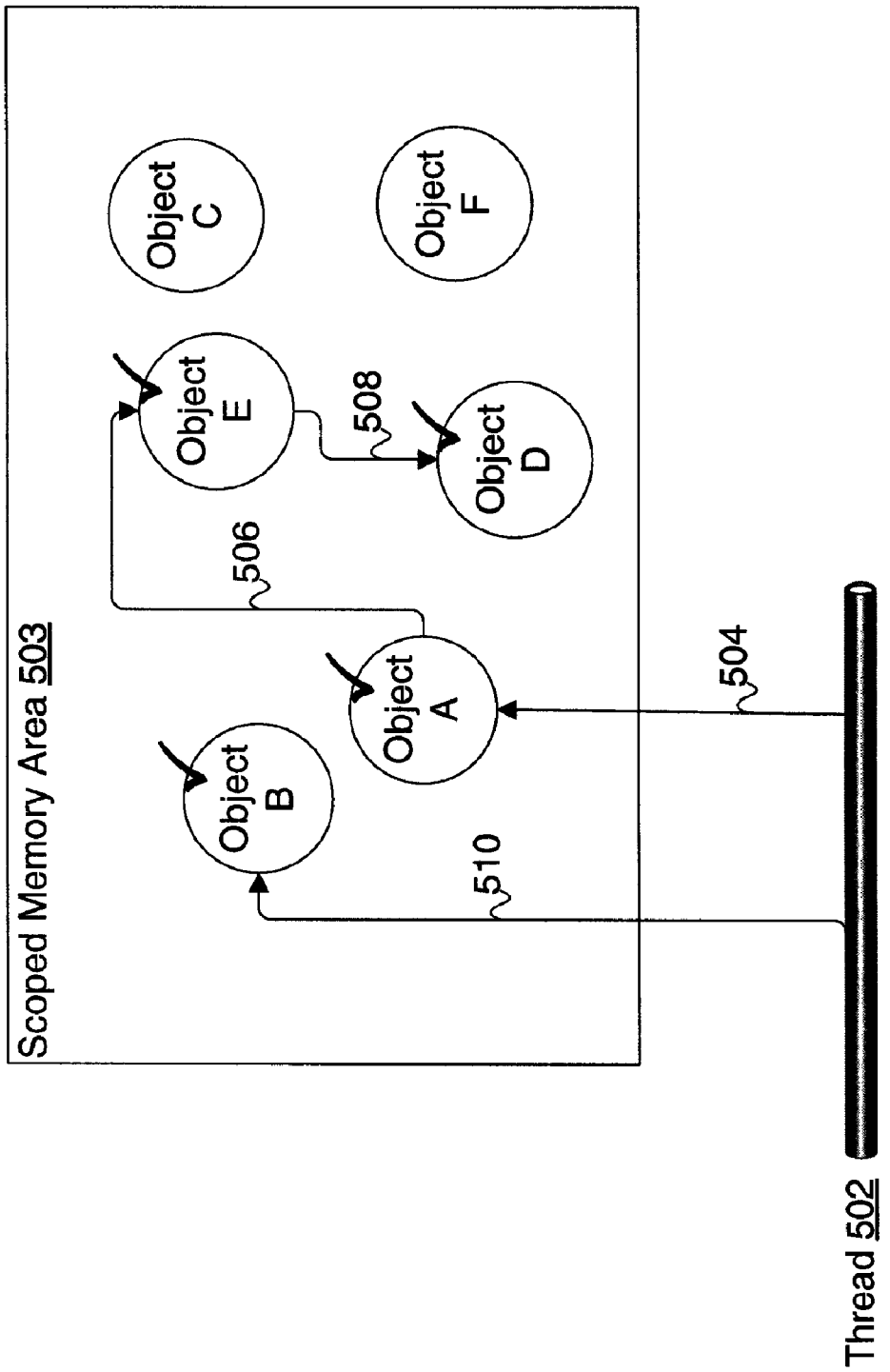
FIG. 5 is an example block diagram of a scoped memory area in use by a thread in accordance with one illustrative embodiment of the present invention.

FIG. 5 is an example block diagram of a scoped memory area 503 in use by a thread 502 in accordance with one illustrative embodiment of the present invention. Thread 502 enters the scoped memory area 503 for the allocation of objects B and A. Other objects C, D, E and F are also allocated in the scoped memory area 503 and are variously referenced and unreferenced. The method of FIG. 4 will now be applied to the arrangement of FIG. 5 to illustrate a method of the preferred embodiment of the present invention.

Initially, at step 402, a set of root references for all objects allocated in the scoped memory area 503 is identified. This set includes only references in thread 502 since thread 502 is the only thread having references to objects in the scoped memory area 503. Thus, the set of root references comprises references 510 and 504. At step 404 the method traverses each of the root reference 510 and 504 and marks objects in the scoped memory area 503. Thus, traversing root reference 510, object B is marked since it is allocated in the scoped memory area 503. The marking of object B is indicated by a tick. Traversing root reference 504 object A is marked since it is allocated in the scoped memory area 503. The traversal of root reference 504 is recursively performed for reference 506 to object E which is also in the scoped memory area 503 and so is also marked. Further, the traversal of reference 508 to object D which is also in the scoped memory area 503 and so is also marked. Thus, on completion of step 404, objects B, A, E and D are marked in the scoped memory area 503 since these objects are referenced directly or indirectly from the root references 510 and 504. Finally, at step 406, the method identifies objects allocated in the scoped memory area 503 that are not marked. Objects C and F are therefore identified and these objects are discarded. In this way, a process of garbage collection can be applied to the scoped memory area 503.

In order to undertake the operations of FIG. 4 described above, it may be necessary to prevent changes to the references to, and objects within, a scoped memory in order that the scoped memory garbage collector 360 can operate on the scoped memory area 330 in a static state. To achieve this, all threads accessing the scoped memory area 330 are preferably transitioned to a suspended state in which execution of the software threads is stopped.

Correspondingly, on completion of the garbage collection process, all threads accessing the scoped memory area 330 are preferably transitioned from the suspend state to an active state.

Further, on completion of a garbage collection operation it can be preferable to undertake a tidy-up operation on the scoped memory area 330 using compaction. Compaction is a process of moving objects within a memory space such that the memory they occupy is substantially contiguous, leaving relatively large areas of free memory. In contrast, in uncompacted memory, many allocated objects can be widely dispersed leaving many small areas of free memory there-between. Compaction will involve moving objects allocated in the scoped memory area 330 to contiguous (or substantially contiguous) memory locations in the scoped memory area 330. Additionally, references to each moved object will need to be updated to correspond to a new memory location for the object. This is known as a process of fixing up or modifying references.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method, in a data processing system, of memory management in a scoped memory system of the data processing system, the scoped memory system including a scoped memory area for the allocation of objects therein for access by one or more software threads in execution, the method comprising:

identifying, by a scoped memory garbage collector of the data processing system, a set of root references for objects allocated in the scoped memory area of the scoped memory system;

recursively traversing and marking, by the scoped memory garbage collector, objects that are referenced from the set of root references and that are allocated in the scoped memory area of the scoped memory system;

identifying, by the scoped memory garbage collector, objects in the scoped memory area of the scoped memory system that are not so marked; and discarding the identified objects from the scoped memory system, wherein identifying a set of root references further comprises causing the one or more software threads to enter a suspend state in which the execution of the software threads is temporarily stopped, and wherein identifying all objects further comprises causing the one or more software threads to leave the suspend state.

2. The method of claim 1, further comprising compacting the scoped memory area by moving objects allocated in the scoped memory area to contiguous memory locations in the scoped memory area, and updating references to moved objects to refer to the contiguous memory locations in the scoped memory area.

3. The method of claim 1, wherein identifying a set of root references comprises identifying software threads having references to objects allocated in the scoped memory area as root references.

4. The method of claim 1, wherein the one or more software threads are threads restricted to using only scoped memory.

5. The method of claim 1, wherein the one or more software threads include at least one thread that has references to objects in both the scoped memory area and a garbage collected heap.

6. The method of claim 1, wherein the scoped memory garbage collector is implemented as a hardware device in the data processing system.

7. The method of claim 1, wherein:
the scoped memory area is one of a plurality of scoped memory areas provided in the scoped memory system,
each scoped memory area is a sub-portion of the scoped memory system,
the plurality of scoped memory areas have a hierarchical arrangement specified in a scoped memory graph associated with the scoped memory system, and
the scoped memory system is separate from a garbage collected memory heap of the data processing system.

8. An apparatus for memory management in a scoped memory system, the scoped memory system including a scoped memory area for the allocation of objects therein for access by one or more software threads in execution, the apparatus comprising:
a processor; and
a memory coupled to the processor, wherein the memory comprises a computer program which configures the processor to:
identify a set of root references for objects allocated in the scoped memory area;
traverse and mark objects, recursively, that are referenced from the set of root references and that are allocated in the scoped memory area;
identify objects in the scoped memory area that are not so marked; and
discard the identified objects, wherein the computer program further configures the processor to cause the one or more software threads to enter a suspend state in which the execution of the software threads is temporarily stopped in response to initiating a garbage collection of the scoped memory area, and wherein the computer program further configures the processor to cause the one or more software threads to leave the suspend state in response to the identification of the objects in the scoped memory area that are not marked.

9. The apparatus of claim 8, wherein the computer program further configures the processor to compact the scoped memory area by moving objects allocated in the scoped memory area to contiguous memory locations in the scoped memory area, and updating references to moved objects to refer to the contiguous memory locations in the scoped memory area.

10. The apparatus of claim 8, wherein the processor identifies a set of root references by identifying software threads having references to objects allocated in the scoped memory area as root references.

11. The apparatus of claim 8, wherein the one or more software threads are threads restricted to using only scoped memory.

12. The apparatus of claim 8, wherein the one or more software threads include at least one thread that has references to objects in both the scoped memory area and a garbage collected heap.

13. The apparatus of claim 8, wherein:
the scoped memory area is one of a plurality of scoped memory areas provided in the scoped memory system,
each scoped memory area is a sub-portion of the scoped memory system,
the plurality of scoped memory areas have a hierarchical arrangement specified in a scoped memory graph associated with the scoped memory system, and
the scoped memory system is separate from a garbage collected memory heap of the data processing system.

14. A computer program product in a computer readable storage medium, comprising computer program code which, when loaded into a computer system and executed thereon, causes the computer system to:
identify a set of root references for objects allocated in a scoped memory area of a scoped memory system of the computer system;
traverse and mark objects that are referenced from the set of root references and that are allocated in the scoped memory area;
identify objects in the scoped memory area that are not so marked; and
discard the identified objects, wherein the computer program code further causes the computer system to suspend, in response to initiating a garbage collection operation of the scoped memory area, one or more software threads such that the execution of the software threads is temporarily stopped.

15. The computer program product of claim 14, wherein the computer program code further causes the computer system to transition the one or more software threads from a suspend state to an active state in response to the identification of the objects in the scoped memory area that are not marked.

16. The computer program product of claim 14, wherein the computer program code further causes the computer system to compact the scoped memory area by moving objects allocated in the scoped memory area to contiguous memory locations in the scoped memory area, and updating references to moved objects to refer to the contiguous memory locations in the scoped memory area.

17. The computer program product of claim 14, wherein the computer system identifies a set of root references by identifying software threads having references to objects allocated in the scoped memory area as root references.

18. The computer program product of claim 14, wherein the one or more software threads are threads restricted to using only scoped memory.

19. The computer program product of claim 14, wherein the one or more software threads include at least one thread that has references to objects in both the scoped memory area and a garbage collected heap.

20. The computer program product of claim 14, wherein:
the scoped memory area is one of a plurality of scoped memory areas provided in the scoped memory system,
each scoped memory area is a sub-portion of the scoped memory system,
the plurality of scoped memory areas have a hierarchical arrangement specified in a scoped memory graph associated with the scoped memory system, and
the scoped memory system is separate from a garbage collected memory heap of the data processing system.

21. A computer system, comprising:
a processor;
a scoped memory system coupled to the processor, the scoped memory system including a scoped memory area for the allocation of objects therein for access by one or more software threads in execution on the processor; and
a scoped memory garbage collector coupled to the scoped memory system,
wherein the scoped memory garbage collector operates to:
suspend, in response to initiating a garbage collection operation of the scoped memory area, the one or more software threads such that the execution of the software threads is temporarily stopped;
identify a set of root references for objects allocated in the scoped memory area;
traverse and mark objects that are referenced from the set of root references and that are allocated in the scoped memory area;
identify objects in the scoped memory area that are not so marked; and
discard the identified objects.

* * * * *